(12) United States Patent
Lee et al.

(10) Patent No.: US 11,292,732 B2
(45) Date of Patent: Apr. 5, 2022

(54) WATER PURIFIER AND CONTROL METHOD OF THE SAME

(71) Applicant: Samsung Electronics Co., Ltd., Suwon-si (KR)

(72) Inventors: Jongho Lee, Suwon-si (KR); Kookjeong Seo, Suwon-si (KR); Hyesoon Yang, Suwon-si (KR); Jungsoo Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 16/705,745

(22) Filed: Dec. 6, 2019

(65) Prior Publication Data

US 2020/0180980 A1 Jun. 11, 2020

(30) Foreign Application Priority Data

Dec. 7, 2018 (KR) .................. 10-2018-0156682

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 61/12* (2013.01); *C02F 1/001* (2013.01);
(Continued)

(58) Field of Classification Search
CPC C02F 1/441; C02F 2209/11; C02F 2209/001; C02F 2209/05; C02F 1/001;
(Continued)

(56) References Cited

U.S. PATENT DOCUMENTS 5,132,017 A * 7/1992 Birdsong ............... B01D 61/08
210/267
7,632,410 B2 12/2009 Heiss
(Continued)

FOREIGN PATENT DOCUMENTS

CN 205216585 U 5/2016
CN 107522308 A 12/2017
(Continued)

OTHER PUBLICATIONS

International Search Report dated Mar. 23, 2020, in corresponding International Patent Application No. PCT/KR2019/016891.
(Continued)

*Primary Examiner* — Krishnan S Menon
(74) *Attorney, Agent, or Firm* — Staas & Halsey LLP (57) ABSTRACT

Disclosed is a water purifier. The water purifier includes a water quality sensor configured to measure quality of water that is suppled from a water supply source, a first filter configured to filter by a first method, a second filter configured to filter by a second method, a flow path shifting valve configured to selectively supply water that is supplied from the water supply source to the first filter or the second filter, and a processor configured to control the flow path shifting valve based on a water quality value that is measured by the sensor.

18 Claims, 6 Drawing Sheets

(51) Int. Cl.
  *B01D 61/12* (2006.01)
  *C02F 1/00* (2006.01)
(52) U.S. Cl.
  CPC .... *B01D 2311/04* (2013.01); *C02F 2209/005* (2013.01); *C02F 2209/11* (2013.01); *C02F 2209/40* (2013.01)
(58) Field of Classification Search
  CPC ............ C02F 2209/005; C02F 2209/40; C02F 2209/445; C02F 2301/028; C02F 1/283; C02F 2201/005; C02F 1/008; B01D 61/025; B01D 61/12; B01D 2311/04
  See application file for complete search history.

(56) References Cited

U.S. PATENT DOCUMENTS

| | | | |
|---|---|---|---|
| 10,266,441 B2 | 4/2019 | Lee et al. | |
| 2008/0023400 A1* | 1/2008 | Kloos | C02F 1/006 210/650 |
| 2010/0264073 A1 | 10/2010 | Teng | |
| 2012/0024003 A1* | 2/2012 | Kim | F25D 25/025 62/389 |
| 2013/0313191 A1 | 11/2013 | Wolf et al. | |
| 2017/0305758 A1 | 10/2017 | Yokohama et al. | |
| 2018/0111070 A1* | 4/2018 | Burrows | B01D 61/12 |
| 2019/0112200 A1 | 4/2019 | Sonnay | |

FOREIGN PATENT DOCUMENTS

| | | |
|---|---|---|
| JP | 2011-255349 | 12/2011 |
| KR | 10-0278516 B1 | 2/2001 |
| KR | 10-2003-0062838 A | 7/2003 |
| KR | 10-2011-0127588 | 11/2011 |
| KR | 10-1210872 B1 | 12/2012 |
| KR | 10-2016-0008308 | 1/2016 |
| WO | WO 2017/165984 A1 | 10/2017 |

OTHER PUBLICATIONS

Written Opinion of the International Searching Authority dated Mar. 23, 2020, in corresponding International Patent Application No. PCT/KR2019/016891.
Extended European Search Report dated Mar. 24, 2020, in corresponding European Patent Application No. 19213617.4.
Communication pursuant to Article 94(3) EPC dated Sep. 14, 2020, in corresponding European Patent Application No. 19 213 617.4.
European Office Action dated May 12, 2021, from European Application No. 19213617.4 (9 pages).
Notice of Allowance dated Feb. 25, 2022 issued by the European Patent Office for European Patent Application No. 19213617.4.

* cited by examiner

WATER PURIFIER AND CONTROL METHOD OF THE SAME

CROSS-REFERENCE TO RELATED APPLICATION(S)

This application is based on and claims priority under 35 U.S.C. § 119(a) of a Korean patent application number 10-2018-0156682, filed on Dec. 7, 2018, in the Korean Intellectual Property Office, the disclosure of each of which is incorporated by reference herein in its entirety.

BACKGROUND

1. Field

The disclosure relates to a water purifier and a control method thereof.

2. Description of the Related Art

Generally, a water purifier is a device for filtering water supplied from a water supply source to provide drinking water, and is widely used for a home use. Specifically, a water purifier may be connected to a water supply source, remove suspended or harmful components contained in water by using a filter, and purify water as much as desired according to a manipulation of a user to discharge purified water.

As such, a water purifier that supplies drinkable water to a user should be provided to a user in a manner that purified water satisfies a predetermined criterion.

In general, since a filter provided in a water purifier is configured in accordance with the water quality of tap water provided from a water source, it is not filtered according to impurities dissolved in water depending on the water quality of water provided to the water purifier.

The related-art water purifier has problems in that there would be no filtering effect, if water such as groundwater that is different from waterworks is filtered, or the waterworks piping is aged, and the tap water supplied from the waterworks is filtered, and that an optimal action cannot be taken according to the water quality of the water provided to the water purifier.

SUMMARY

The disclosure relates to a water purifier that may select a filter according to water quality of water supplied from a water supply source and filter the water.

A water purifier includes a water quality sensor configured to measure quality of water that is suppled from a water supply source, a first filter configured to filter by a first method, a second filter configured to filter by a second method, a flow path shifting valve configured to selectively supply water that is supplied from the water supply source to the first filter or the second filter, and a processor configured to control the flow path shifting valve based on a water quality value that is measured by the sensor.

The first method may be a direct-type water purification method, and the second method may be a reverse osmosis water purification method.

The processor may control the flow path shifting valve to, based on the measured water quality value being less than a predetermined water quality value, supply the water supplied from the water supply source to the first filter, and based on the measured water quality value being greater than a predetermined water quality value, supply the water supplied from the water supply source to the second filter.

The water purifier may further include a first water purifying line configured to be placed between the first filter and a water intake line to discharge purified water, and a second water purifying line configured to be placed between the second filter and the water intake line, and the second water purifying line may be formed to be longer than the first water purifying line.

The second water purifying line may be disposed in a form to be wound by a plurality of times.

The water quality sensor may measure electrical conductivity of the water supplied from the water supply source.

The water purifier may further include a pre-treatment filter receiving the water supplied from the water supply source before the first filter and the second filter, and a post-treatment filter receiving water from the first filter and the second filter.

The flow path shifting valve may selectively supply the water that is discharged from the pre-treatment filter to the first filter or the second filter.

The water quality sensor may detect quality of water that is supplied to the pre-treatment filter.

The water purifier may include a first flow sensor configured to detect an amount of the water that is supplied to the first filter and a second flow sensor configured to detect an amount of the water that is supplied to the second filter.

The processor may determine whether to replace the first filter based on the amount of water that is measured by the first flow sensor, and determine whether to replace the second filter based on the amount of water that is measured by the second flow sensor.

The processor may, in response to determination that the first filter needs to be replaced, generate a filter replacement notification signal, and control the flow path shifting valve to supply the water supplied from the water supply source only to the first filter.

The processor may, based on determination that the second filter needs to be replaced, generate a filter replacement notification signal, and based on the measured water quality value being greater than a predetermined water quality value, not to perform a water discharge command to discharge purified water.

According to an embodiment, a method for controlling a water purifier is provided. The method includes measuring quality of water that is suppled from a water supply source; and selectively supplying water that is supplied from the water supply source to the first filter or the second filter based on a measured water quality value.

The first method may be a direct-type water purification method, and the second method may be a reverse osmosis water purification method.

The supplying to the first filter or the second filter may include, based on the measured water quality value being less than a predetermined water quality value, supplying the water supplied from the water supply source to the first filter, and based on the measured water quality value being greater than a predetermined water quality value, supplying the water supplied from the water supply source to the second filter.

The method may further include detecting an amount of the water that is supplied to the first filter and the second filter, respectively.

Whether to replace the first filter or the second filter may be determined based on the detected amount of water that is supplied to the first filter and the second filter.

In response to determination that the first filter needs to be replaced, a filter replacement notification signal may be generated, and the water supplied from the water supply source may be supplied only to the second filter.

Based on determination that the second filter needs to be replaced, a filter replacement notification signal may be generated, and based on the measured water quality value being greater than a predetermined water quality value, a water discharge command to discharge purified water may not be performed.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Hereinafter, embodiments of the water purifier and a control method thereof will be further described.

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

Terms such as first and second may be used to describe various components, but the components should not be limited by the terms. The terms may be used only for the purpose of distinguishing one component from another component. For example, without departing from the scope of the present disclosure, the first component may be referred to as the second component, and similarly the second component may also be referred to as the first component.

Terms used in the embodiments of the disclosure may be interpreted as meanings commonly known to those of ordinary skill in the art unless otherwise defined.

In addition, terms such as "front end", "back end", "upper portion," "lower portion", "upper end", "lower end," or the like, used in the disclosure are defined based on the drawings, and by each term, the shape and location of each component is not limited.

Hereinafter, with reference to the accompanying drawings, embodiments will be described in detail.

Figure 1:
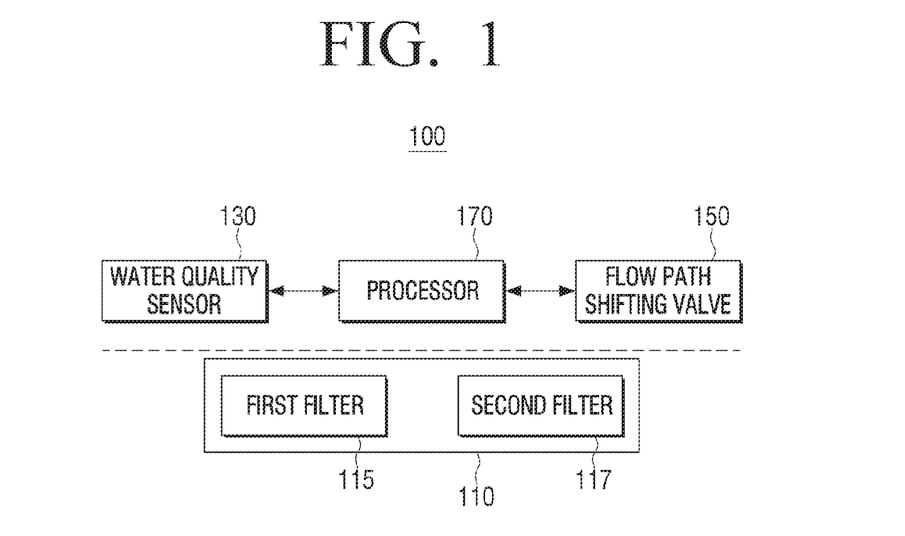
FIG. 1 is a block diagram illustrating a simple configuration of a water purifier according to an embodiment.

FIG. 1 is a block diagram illustrating a simple configuration of a water purifier according to an embodiment.

Referring to FIG. 1, a water purifier 100 according to an embodiment may include a filter 110 including a plurality of filters, a water quality sensor 130 for measuring the water quality of water provided to the water purifier 100 from a water supply source, a flow path shifting valve 150 for selectively providing water provided from the water supply source to a first filter 115 or a second filter 117, and a processor 170 for controlling the flow path shifting valve 150.

The filter 110 may include a plurality of filters. To be specific, the filter 110 may include the first filter 115 for filtering using a first method and the second filter 117 for filtering using a second method.

The first filter 115 may be composed of a direct-type membrane filter 115 for filtering water using a direct-type water purifying method.

By not using the water storage tank provided inside the water treatment device for water filtered by the filter 110, the filtered water in the filter 110 can be directly supplied to the user by the direct-type water purification, thereby improving the sanitation.

The first filter 115 may function as a main filter for removing fine contaminants, and may be a filter having a high filtering force such as a hollow fiber membrane filter and a nano trap filter. At this time, the hollow fiber membrane filter (ultrafiltration filter, UF filter) is a porous filter having pores of a size of tens of nanometers to hundreds of nanometers (nm), and remove contaminants in the water through a large number of micropores distributed on the surface of the membrane. In addition, the nanotrap filter is a filter for adsorbing and removing bacteria, micro-viruses, and harmful substances by electrostatic force. However, the filter used in the first filter 115 is not limited to the hollow fiber membrane filter and the nano trap filter described above, but various filters having a direct-type water purification system which may remove fine contaminants can be used.

The second filter 117 may be composed of a reverse osmosis filter for filtering water using reverse osmosis water purification method.

The second filter 117 may include a reverse osmosis membrane and may purifier water supplied through reverse osmosis, and may filter not only heavy metals such as lead and arsenic but also sodium, various pathogens, or the like.

The second filter 117 functions as a main filter to remove fine contaminants, and typically a reverse osmosis membrane filter can be used. At this time, the reverse osmosis membrane filter (RO filter) is composed of a reverse osmosis membrane having fine pores, and can filter heavy metals such as lead and arsenic as well as sodium, various pathogens, or the like.

The water quality sensor 130 may measure water quality of water that is provided from the water supply source and flown into the water purifier 100.

The water quality sensor 130 may be composed of a total dissolved solids (TDS) sensor for measuring the electrical conductivity of water provided from the water supply source. In addition, the water quality sensor 130 may further include a turbidity sensor for measuring the turbidity of water provided from the water supply source as the auxiliary sensor of the TDS sensor. The water quality sensor 130 may increase the accuracy of the measured water quality by adding a turbidity sensor to the TDS sensor.

It has been described that the water quality sensor 130 is composed of the TDS sensor, but the embodiment is not limited thereto, and the water quality sensor 130 can be configured to measure at least one of turbidity, pH, residual chlorine concentration, heavy metal concentration, TDS, dissolved oxygen, or the like, of water flown into the water purifier. In other words, the water quality sensor 130 may include at least one of a turbidity sensor, an ion sensor, a chlorine concentration sensor, a heavy metal concentration sensor, a TDS sensor, and a biochemical oxygen dynamometer (BOD) sensor.

The flow path shifting valve 150 may provide the water provided from the water supply source selectively to the first filter 115 or the second filter 117. The water purifier 100 may include a water line through which water provided from a water supply source is discharged through a plurality of filters. The flow path shifting valve 150 may be provided on the water line. The water line may be branched from the flow path shifting valve 150 and may be formed to pass through the first filter 115 or the second filter 117. The flow path shifting valve 150 may operate based on the water quality of the water sensed by the water quality sensor 130.

The processor 170 may perform the control for each configuration in the water purifier 100. To be specific, the processor 170, upon receiving a water discharging command to provide drinking water from a user, may control a driver (not shown) to provide drinking water.

The processor 170 may control the flow path shifting valve 150 based on the water quality of water sensed by the water quality sensor 130. The processor 170 may control the flow path shifting valve 150 to perform filtering according to the water quality of water measured by the water quality sensor 130.

The processor 170 may compare the water quality value measured by the water quality sensor 130 with a predetermined water quality value. Here, the water quality value may be defined by a factor detected by the water quality sensor 130. The predetermined water quality value is the water quality value for the tap water supplied from the water source.

To be specific, the processor 170 may control the flow path shifting valve 150 so as to provide water to the direct-type first filter 115 when the measured water quality value is less than a predetermined water quality value, and provide water to the second filter 117 using reverse osmosis purification method when the measured water quality value is greater than a predetermined water quality value.

As an example, the water quality value measured by the water quality sensor 130 may be determined according to the amount of ions contained in the water and the turbidity of the water. In this case, the predetermined water quality value corresponds to the amount of ions contained in the tap water supplied from the water source and the turbidity of the water. The predetermined water quality value can be set to 50 us or more and 250 us or less, and the turbidity can be set to 0.5 NTU.

Accordingly, when the measured water contains ions in the similar level of tap water, the processor 170 may control the flow path shifting valve 150 to supply water to the first filter 115 using the direct-type water purification method.

The water supplied from the water supply source to the water purifier 100 may contain more ions than the tap water, and can be turbid due to the abnormality in piping or introduction of the contaminant water. The water quality value of this water can be measured to be greater than or equal to about 500 us of electrical conductivity or turbidity greater than or equal to 2.5 NTU, so that the water quality value is significantly greater than the predetermined water quality value. In this case, the processor 170 may control the flow path shifting valve 150 to supply water to the second filter 117, which is a reverse osmosis water purification method. The ionic material included in the water can be removed through the second filter 117.

The water purifier 100 according to an embodiment may perform filtering to be suitable to water quality of water measured by the water quality sensor 130. Accordingly, even when water of quality different from the water quality provided from the water source is provided, purified water that satisfies a predetermined criterion may be provided. That is, regardless of flown water, a predetermined filtering level may be maintained.

Figure 2:
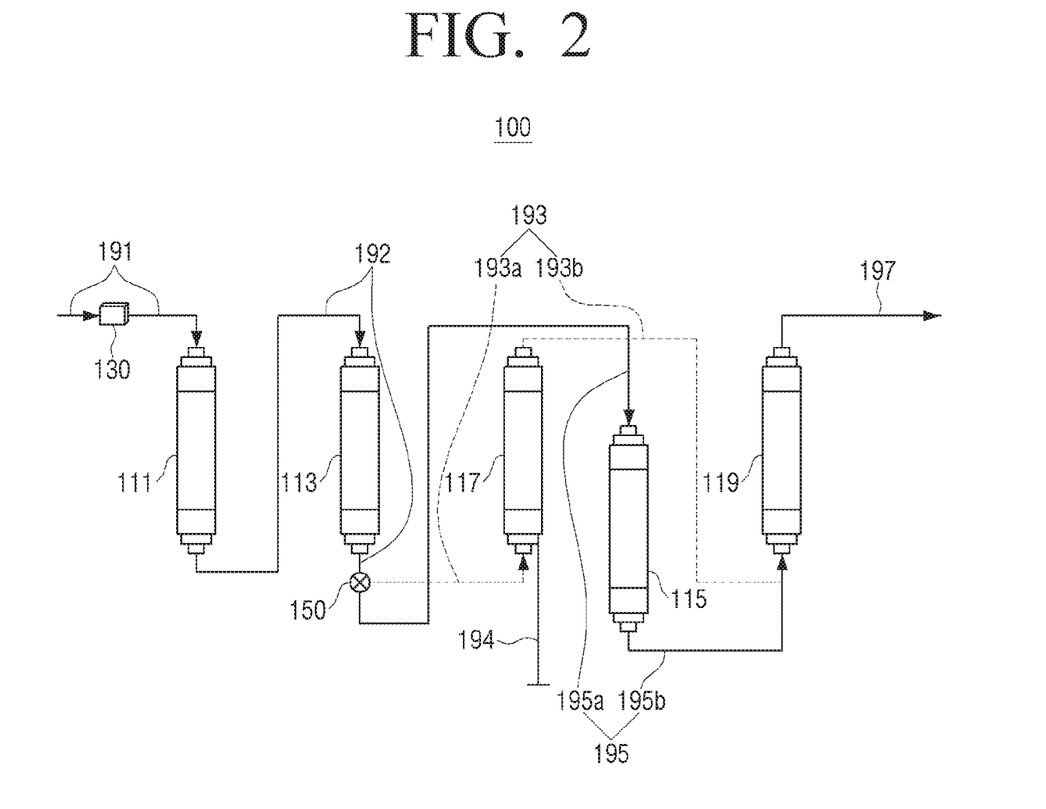
FIG. 2 is an inside configuration map that briefly illustrates a water purification process of a water purifier according to an embodiment.

FIG. 2 is an inside configuration map that briefly illustrates a water purification process of a water purifier according to an embodiment.

Referring to FIG. 2, the water purifier 100 may include the filter 110 including a plurality of filters, the water quality sensor 130 for measuring water quality of water supplied to the filter 110, and the flow path shifting valve 150 for shifting the flow path of the filter 110 for filtering water supplied to the filter 110 selectively using the direct-type water purification method or reverse osmosis water purification method.

The filter 110 may include a pre-treatment filter 111, 113, the first filter 115, the second filter 117, and a post-treatment filter 119.

The pre-treatment filters 111 and 113 may be composed of a sediment filter 111, which receives water from a water supply source and removes dust, debris, various floating materials through a fine filter in the size of about five micron and a pre-carbon filter 113 which removes chlorine components and chemicals harmful to the human body such as trihalomethanes (THM), a synthetic detergent, an insecticide, or the like, by using an adsorption method of activated carbon.

The first filter 115 may be composed of the hollow fiber membrane filter, nano trap filter, or the like, for removing fine contaminants.

The second filter 117 may be composed of a reverse osmosis membrane filter 117 which is composed of a reverse osmosis membrane of 0.0001 micron for filtering not only heavy metals such as lead and arsenic but also sodium, various pathogens, or the like, and discharging the concentrated living water through a drain pipe 194.

The post-treatment filter 119 may be composed of a post-carbon filter that is connected to the first filter 115 by a first water purifying line 195, and connected to the second filter 117 by a second water purifying line 193, for removing unpleasant taste, odor, coloring, or the like, included in water that passed through the first filter 115 and the second filter 117.

However, the type or number of filters installed before or after the first and second filters 115 and 117 is not limited thereto. For example, in FIG. 2, it has been illustrated that the pre-treatment filters 111 and 113 are respectively formed in the form of an independent cartridge, but the embodiment is not limited thereto, and the pre-treatment filters 111 and 113 may be formed of a composite filter having functions of two or more filters. The sediment filter 111 and the pre-carbon filter 113 may be configured as a single pre-treatment filter.

The water quality sensor 130 may be installed in a water supply line 191 between the water supply source and the pre-treatment filters 111 and 113. To be specific, the water quality sensor 130 may be installed in the water supply line 191 between the water supply source and the sediment filter 111.

The water quality sensor 130 may measure the quality of water provided from the water supply source to the filter 110. The water purifier 100 may select a filter for supplying water according to the water quality value measured by the water quality sensor 130.

The water supplied in accordance with the water quality value measured by the water quality sensor 130 may be selectively supplied to the first filter 115 or the second filter 117.

The flow path shifting valve 150 may be installed at a point where a first water purifying line 195, between the pre-treatment filters 111 and 113 and the first filter 115, and a second water purifying line 193, between the pre-treatment filters 111 and 113 and the second filter 117, meet. Specifically, the flow path shifting valve 150 may be provided at a part at a lower end of the pre-carbon filter 113 where the second water purifying line 193 and the first water purifying line 195 are connected.

The flow path shifting valve 150 may supply the water which passed the pre-treatment filters 111 and 113 to one side of the first filter 115 and the second filter 117 by the processor 170.

The filter 110 may include a pre-treatment line 192 between the water supply line 191 and the first water purifying line 195 and the second water purifying line 193, through which water that passed at least one pre-treatment filter 111, 113 is discharged. The pre-treatment line 192 may filter the supplied water primarily.

One side of the flow path shifting valve 150 may be connected to the pre-treatment line 192, and the other side thereof can be connected to the first water purifying line 195 and the second water purifying line 193, respectively. The flow path shifting valve 150 may switch the flow path to provide the water having passed through the pre-treatment filters 111 and 113 to the first filter 115 or the second filter 117 according to the measured water quality value.

For example, when the measured water quality value is equal to or less than the preset water quality value, the flow path shifting valve 150 may shift the flow path so that the water that passed through the pre-treatment filters 111 and 113 flows to the first water purifying line 195 to be provided to the first filter 115. For example, when the measured water quality value exceeds the preset water quality value, the flow path shifting valve 150 may shift the flow path so that the water that passed through the pre-treatment filters 111 and 113 flows to the second water purifying line 193 to be provided to the second filter 117.

The first water purifying line 195 may include a first water purifying line front end 195a formed at the front end of the first filter 115 and a rear end 195b of the first water purifying line formed at the rear end of the first filter 115. The first water purifying line front end 195a is a flow path through which water passed through the pre-treatment filters 111 and 113 is supplied to the first filter 115, and the first water purifying line front end 195a is a flow path through which the water passing through the first filter 115 is provided to the post-treatment filter 119.

The second water purifying line 193 may include a second water purifying line front end 193a formed at the front end of the second filter 117 and a second water purifying line rear end 193b formed at the rear end of the second filter 117. The second water purifying line front end 193a is a flow path through which water passed through the pre-treatment filters 111 and 113 is provided to the second filter 117, and the second water purifying line front end 193a is a flow path through which the water passing through the second filter 117 is provided to the post-treatment filter 119.

The second filter 117 by the reverse osmosis water purification method has small flow rate and thus, by forming the second water purifying line rear end 193b in which the water which passed the second filter 117 flows to be long, flow rate of water collected in the second water purifying line 193 may be secured without including a separate water tank.

The rear end 193b of the second water purifying line may be formed to be longer than a preset length in order to secure purified water that passed through the second filter 117, and the rear end 193b of the second water purifying line may be formed to be longer than the rear end 195b of the first water purifying line.

Although the second water purifying line rear end 193b between the second filter 117 and the post-treatment filter 119 has been described as being long, it is not limited thereto, and the flow path through which the water having passed through the second filter 117 can be stored may be formed long. For example, the water discharge line 197 formed at the rear end of the post-treatment filter 119 may be formed to be long, or the flow path connected to the cold/hot apparatus in the water discharge line 197 may be formed to be long.

The filtered water from the second filter 117 is not drained from a water tank storing the separate purified water when the user presses the selection button to be drunken by the user, but the amount of water (about of 0.5 f) stored in the rear end 193b of the second water purifying line may be discharged through the water discharge line 197.

By forming the flow path that has passed through the second filter 117 to be long, the purified water can be directly supplied to the user even in the reverse osmosis water purification method passing through the second filter 117, thereby improving the hygiene. Since water can be stored in the second water purifying line 193 where water flows without using a separate water tank in which the purified water is stored, there is no concern for microbial contamination. In addition, unlike the water tank where a separate washing is required, the second water purifying line 193 can be cleaned by flowing the sterilized water therein, thereby facilitating washing and sterilization.

Forming the flow path to be long may minimize the volume of the water purifier 100 rather than including a separate water tank and thus, the water purifier 100 of a compact structure may be provided.

One end of each of the first water purifying line 195 and the second water purifying line 193 may be connected to the flow path shifting valve 150, and the other end may be connected to the post-treatment filter 119. The rear end of post-treatment filter 119 may include the water discharge line 197 that supplies filtered water to the user.

Figure 3:
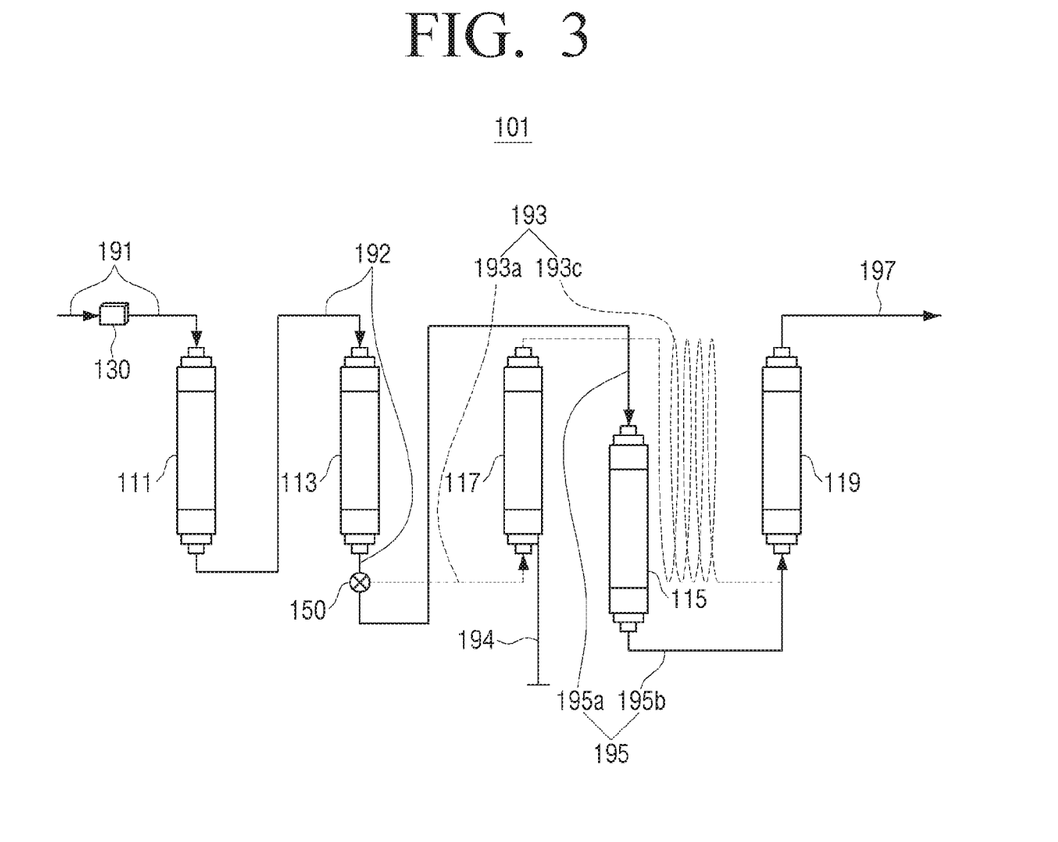
FIG. 3 is an inside configuration map that briefly illustrates a water purification process of a water purifier according to another embodiment.

FIG. 3 is an inside configuration map that briefly illustrates a water purification process of a water purifier according to another embodiment.

Referring to FIG. 3, the water purifier 101 according to another embodiment has mostly the same configuration as that of the water purifier 100 illustrated in FIG. 2, except that the second water purifying line 193 of the filter 110 is arranged in a plurality of wound forms. Therefore, the water purifier 101 according to another embodiment will be described with reference to the different structure of the second water purifying line 193 and detailed description of the overlapped configuration that is the same as the water purifier 100 as illustrated in FIG. 2 will be omitted.

The second water purifying line 193 may include the second water purifying line front end 193a formed at the front end of the second filter 117 and a second water purifying line rear end 193c formed at the rear end of the second filter 117. The second water purifying line front end 193a is a flow path through which water passed through the pre-treatment filters 111 and 113 is provided to the second filter 117, and the second water purifying line front end 193a is a flow path through which the water passing through the second filter 117 is provided to the post-treatment filter 119.

The second water purifying line rear end 193c may be formed to be longer than a predetermined length in order to obtain the purified water passing through the second filter 117, and the second water purifying line rear end 193c may be formed to be longer than the first water purifying line rear end 195b. The second water purifying line rear end 193c may be arranged such that a part of an area of the second water purifying line rear end 193c for storing water that passed through the second filter 117 is in a plurality of wound forms.

Accordingly, the water that passed through the second filter 117 may be stored in the second water purifying line rear end 193c that is wound in a plurality of times and thus, a separate water tank is not necessary and flow rate of water that is discharged in the second water purifying line 193 may be secured.

It has been described that the second water purifying line rear end 193c between the second filter 117 and the post-treatment filter 119 has been described as being arranged in a plurality of wound forms, but the embodiment is not limited thereto, and a plurality of wound areas may be formed in a flow path in which water than passed through the second filter 117 may be stored. By winding the flow path which passed through the second filter 117 for several times to be long, the volume of the water purifier 101 can be minimized, and the water purifier 101 having a compact structure may be provided.

Figure 4:
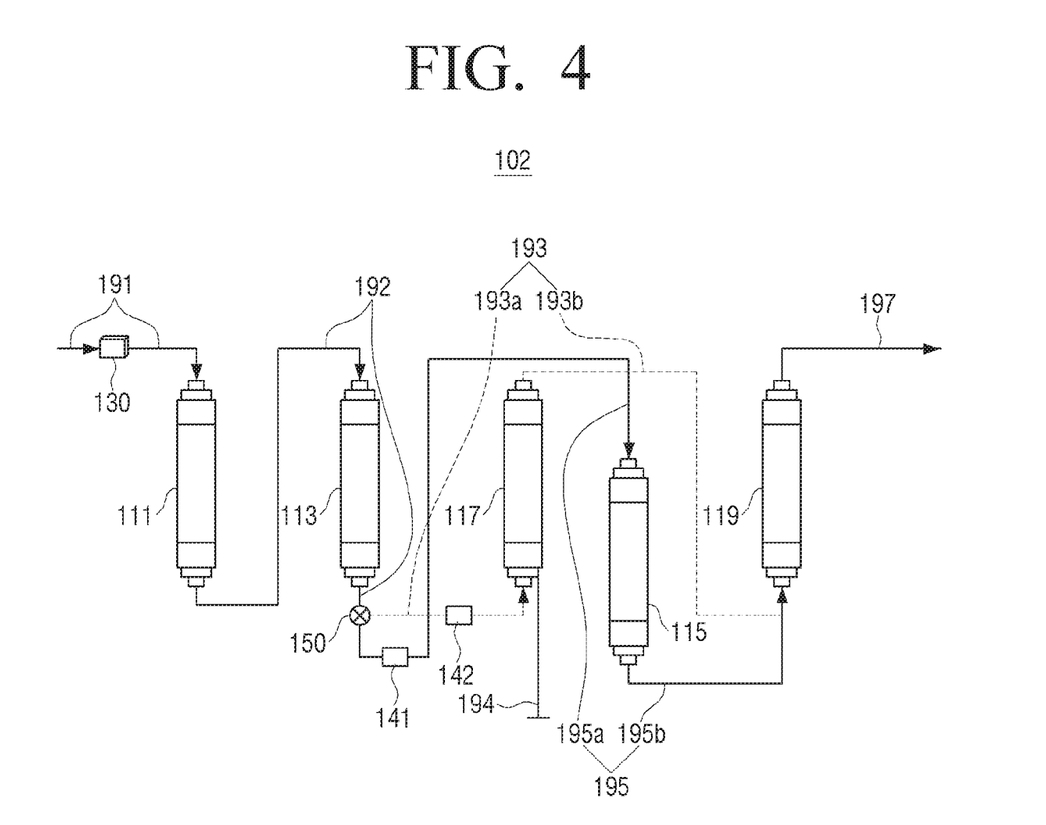
FIG. 4 is an inside configuration map that briefly illustrates a water purification process of a water purifier according to still another embodiment.

FIG. 4 is an inside configuration map that briefly illustrates a water purification process of a water purifier according to still another embodiment.

Referring to FIG. 4, the water purifier 102 according to another embodiment has mostly the same structure as the water purifier 100 illustrated in FIG. 2, except that the flow sensors 141 and 142 are disposed in the first and second water purifying lines 195 and 193 of the filter 110, respectively. Accordingly, the water purifier 102 according to another embodiment will be described with respect to the structure in which the flow sensors 141 and 142 are disposed in the first and second water purifying lines 195 and 193, respectively, which is the different configuration, and overlapping configuration as the water purifier 100 as described in FIG. 2 will be omitted.

The water purifier 102 may include the first flow sensor 141 for measuring an amount of water supplied to the first filter 115 and the second flow sensor 142 for measuring an amount of water supplied to the second filter 117.

The first flow sensor 141 may be disposed in the first water purifying line 195, and specifically, may be disposed at the first water purifying line front end 195a. Since the first filter 115 is a direct-type water purification filter, the difference between the amount of water provided to the first filter 115 and the amount of water passing through the first filter 115 is small, so that the first flow sensor 141 can also be disposed at the rear end 195b of the first water purifying line.

The second flow sensor 142 may be disposed in the second water purifying line 193, and may be specifically disposed at the second water purifying front end 193a. Since the second filter 117 is a reverse osmosis water purifying filter, a portion of the water passing through the second filter 117 is discharged through the drain pipe 194. Accordingly, the second flow sensor 142 may be disposed at the front end of the second filter 117 because the amount of water provided to the second filter 117 should be measured in order to measure the amount of water passing through the second filter 117.

The water purifier 102 according to an embodiment may include a notification device (not shown) for notifying the user of whether to replace a filter in the filter 110.

Whether to replace the first filter 115 may be determined by the processor 170 through the amount of water passing through the first filter 115 measured by the first flow sensor 141, and whether the second filter 117 is replaced can be determined by the processor 170 through the amount of water passing through the second filter 117 measured by the second flow sensor 142.

The processor 170 may generate a filter replacement notification signal when replacement of the first filter 115 or the second filter 117 is necessary. The notification device may guide the filter replacement to a user by receiving the filter replacement notification signal.

The notification device may be configured as a device, such as a lighting, speaker, display, or the like. In addition, the notification device may be configured with communication technology (for example, near-field communication (NFC), etc.) to guide the user to filter replacement and to guide the user's mobile phone or guide the user's mobile phone to a dedicated application of the smartphone to enable the user's filter replacement order. Accordingly, the user can quickly respond to the need for replacement of the filter.

The replacement timing of the first filter 115 and the second filter 117 is different from each other. The replacement timing of the first filter 115 is about 12 months and the replacement timing of the second filter 117 is about 24 months. The replacement timing of the first filter 115 and the second filter 117 is different so that if a consumer does not replace the filter, the water that is not filtered adequately may be discharged.

In order to prevent this problem, the processor 170 can control the flow path shifting valve 150 so that water provided from the water supply source is supplied to only the second filter 117 when replacement of the first filter 115 is necessary. In this case, the water provided from the water supply source may be provided to the second filter 117 regardless of the measured water quality value. Since the life of the first filter 115 has been exhausted, water of which measured water quality value is less than a predetermined water quality value can also be filtered through the second filter 117.

If the second filter 117 needs to be replaced, the processor 170 may not perform a water discharge command to discharge the purified water if the measured water quality value of the water provided from the water supply source is greater than the predetermined water quality value. Water having a water quality value greater than the predetermined water quality value must pass through the second filter 117 of the reverse osmosis type to provide purified water that satisfies a predetermined criterion. Therefore, if life of the second filter 117 is exhausted and the second filter 117 needs to be replaced, when water having a water quality value greater than a predetermined water quality value is supplied to the water purifier 102, the water purifier 100 can stop the supply of purified water.

Figure 5:
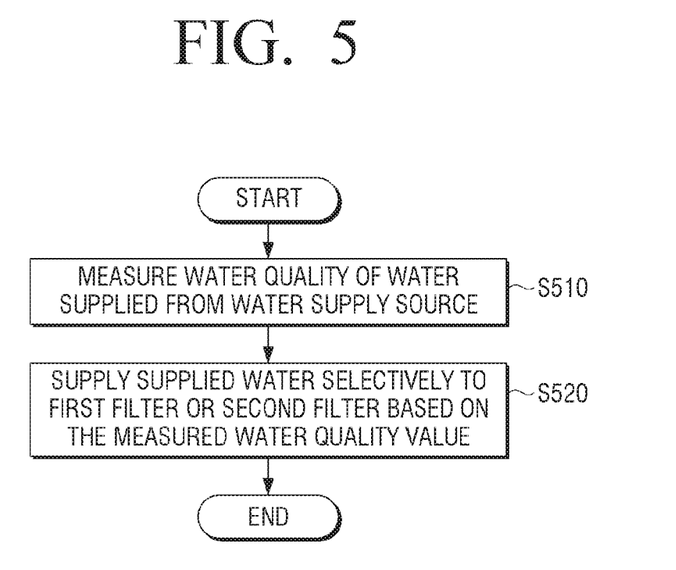
FIG. 5 is a flowchart illustrating a method for water purifying of a water purifier according to an embodiment.

FIG. 5 is a flowchart illustrating a method for water purifying of a water purifier according to an embodiment.

Referring to FIG. 5, the water quality of the water supplied from the water supply source is measured by the water quality sensor 130 provided at the inlet end of the filter 110 in operation S510. The water quality value measured by the water quality sensor 130 may be determined by considering at least one of turbidity, pH, residual chlorine concentration, heavy metal concentration, total dissolved solids (TDS), dissolved oxygen, or the like. Preferably, the water quality sensor 130 may be composed of the TDS sensor for measuring the conductivity of water.

Based on the water quality value measured by the water quality sensor 130 at the inlet end of the filter 110, the supplied water may be selectively provided to the first filter 115 with the direct-type water purification method or to the second filter 117 with the reverse osmosis water purification method.

Specifically, the water pollution level of water can be determined by comparing the water quality value measured by the water quality sensor 130 at the inlet end of the filter 110 with a predetermined water quality value. The higher the level of contamination of the water supplied from the water source, the higher the filtration performance of the filter is required. The preset water quality value can be set to the water quality value of the water quality of the tap water provided from the water supply source.

If the measured water quality value is less than or equal to the predetermined water quality value, the provided water may be filtered by the first filter 115 in a direct-type water purification method. If the measured water quality value is greater than the predetermined water quality value, the provided water may be filtered by the second filter 117 of the reverse osmosis water purification method.

The water purifier 100 according to an embodiment may perform filtering by selecting a suitable filter according to the water quality of the water supplied to the filter 110. Accordingly, even when the groundwater containing the excess ions is introduced into the water purifier 100 or the harmful substance is introduced into the water purifier 100, such as when the water supply source is connected to an old pipe, the water purifier 100 may provide purified water that satisfies a predetermined criterion. That is, it is possible to maintain a predetermined filtering level regardless of the water being introduced.

Figure 6:
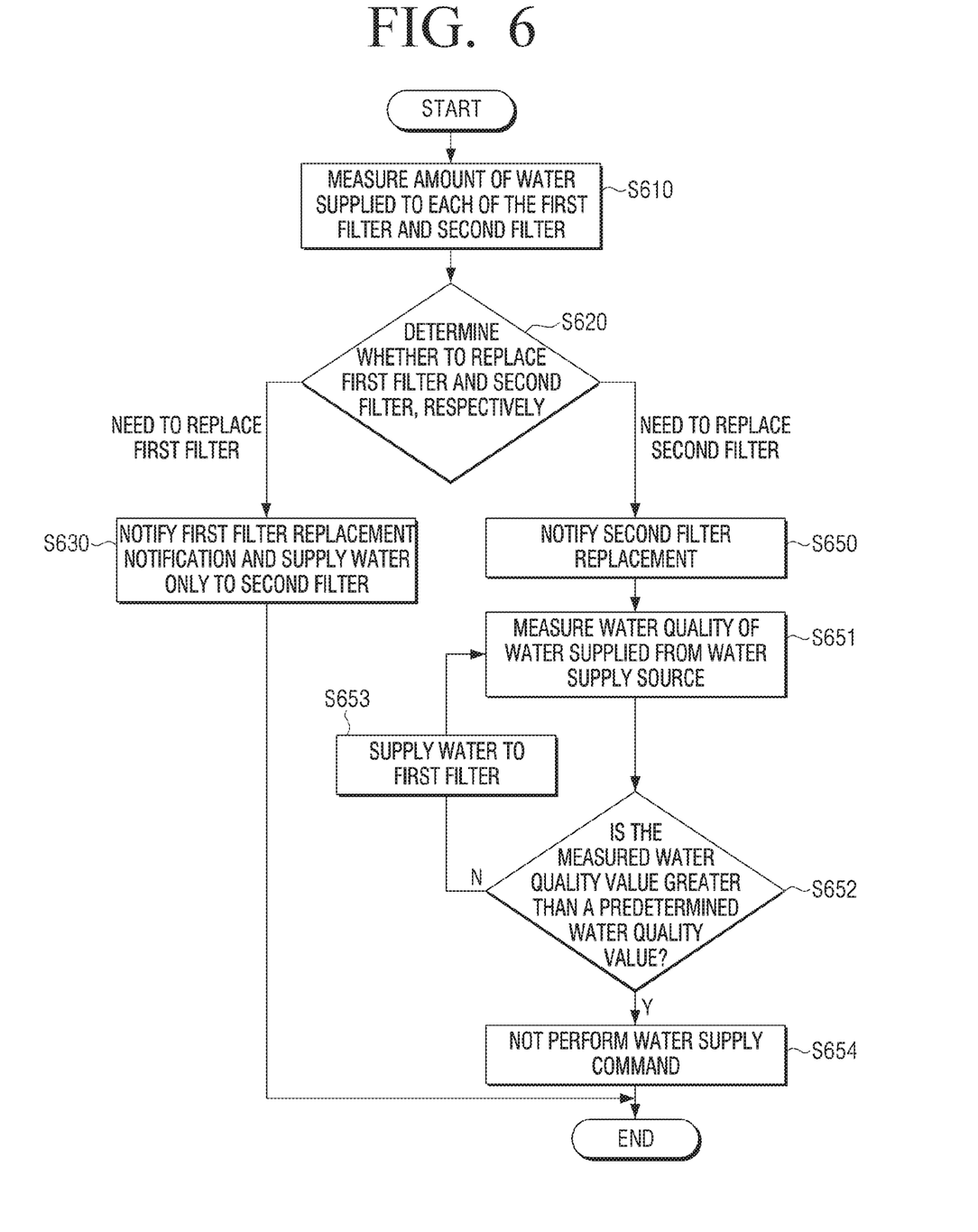
FIG. 6 is a flowchart illustrating a method for water purifying of a water purifier according to another embodiment.

FIG. 6 is a flowchart illustrating a method for water purifying of a water purifier according to another embodiment.

Referring to FIG. 6, first, the amount of water supplied to the first filter 115 is measured by the first flow sensor 141 provided at the inlet end of the first filter 115, and the amount of water supplied to the second filter 117 from the second flow sensor 142 provided at the inlet end of the second filter 117 is measured in operation S610.

The first filter 115 and the second filter 117 are different from each other in terms of the water purification method and thus, there may be a difference in the replacement timing. Accordingly, the amount of water introduced into each of the first filter 115 and the second filter 117 may be measured in order to determine the replacement timing of each of the first filter 115 and the second filter 117.

Whether to replace the first filter 115 is determined based on the amount of water measured by the first flow sensor 141 at the inlet end of the first filter 115, and whether to replace the second filter 117 is determined based on the amount of water measured by the second flow sensor 142 at the inlet end of the second filter 117 in operation S620.

If the amount of water measured by the first flow sensor 141 is greater than the first reference value, it is determined that the replacement timing of the first filter 115 has been reached. Here, the first reference value may be set to the allowable flow rate of the first filter 115.

If the amount of water measured by the second flow sensor 142 is greater than the second reference value, it is determined that the replacement timing of the second filter 117 is reached. Here, the second reference value may be set to the allowable flow rate of the second filter 117.

If it is determined that replacement of the first filter 115 is necessary, the user can inform the user of the replacement of the first filter 115, and the water provided from the water supply source is provided only to the second filter 117 in operation S630. The output method of the filter replacement notification signal can output a message through a display, output an alarm sound through a speaker, or output both.

In general, the first filter 115 with the direct-type water purification method may be formed to have a shorter replacement timing than the second filter 117. In order to improve user's filter replacement convenience, if the life of the first filter 115 is exhausted, even if the first filter 115 is not replaced, the water purifier 100 may provide drinking water using the second filter 117.

Since the second filter 117 with the reverse osmosis water purification method may perform a higher level of filtering than the first filter 115 and thus, water having a water quality value less than the predetermined water quality value may provide purified water that satisfies a predetermined criterion, even if the water is filtered by the second filter 117.

In the meantime, if it is determined that the second filter 117 needs to be replaced, the user informs the user of the replacement of the second filter 117 in operation S650. The output method of the filter replacement notification signal can output a message through a display, output an alarm through a speaker, or output both.

Water quality of water provided from the water supply source is measured in operation S651. The measured water quality value and the predetermined water quality value are compared in operation S652.

When the measured water quality value is not greater than the predetermined water quality value, water is provided to the first filter 115 as the basic control method of a water purifier in operation S653.

When the measured water quality value is greater than the predetermined water quality value, user's water discharge command will not be performed in operation S654.

The water purifier 100 can immediately discharge drinking water as the user presses a selection button of purified water such as cold water and hot water. When the selection button is pressed to supply the water inside the filter 110, the water discharge command is input to the water purifier 100. At this time, if the second filter 117 needs to be replaced and the measured water quality value is greater than the predetermined water quality value, the water purifier may not operate to perform the water discharge command.

These processes may be performed on a real-time basis.

Although various embodiments of the disclosure have been described in detail above, it should be understood that each embodiment is not necessarily to be implemented solely, and the configuration and operation of each embodiment may be implemented in combination with at least one other embodiment.

While various embodiments have been illustrated and described with reference to certain drawings, the disclosure is not limited to specific embodiments or the drawings, and it will be understood by those of ordinary skill in the art that various changes in form and details may be made therein without departing from the spirit and scope as defined, for example, by the following claims and their equivalents.

What is claimed is:

1. A water purifier comprising:
    a water quality sensor configured to measure a value indicating a quality of water supplied from a water supply source;
    a first filter configured to filter, by a first method, water supplied to the first filter;
    a second filter configured to filter, by a second method, water supplied to the second filter;
    a flow path shifting valve configured to be controlled to selectively supply water that is supplied from the water supply source to the first filter or the second filter;
    a first water line including a front end between the flow path shifting valve and a front end of the first filter and a rear end formed at a rear end of the first filter, wherein water supplied along the first water line does not pass through the second filter;
    a second water line including a front end between the flow path shifting valve and a front end of the second filter and a rear end formed at a rear end of the second filter, wherein the rear end of the first water line extends from the rear end of the first filter to a point at which the rear end of the first water line and the rear end of the second water line are connected to one another, without passing through the flow path shifting valve; and
    a processor configured to control the flow path shifting valve based on the value measured by the water quality sensor,
    wherein
    in response to the value measured by the water quality sensor being less than a predetermined water quality value, the processor is configured to control the flow path shifting valve to supply the water supplied from the water supply source to the first filter through the first water line such that the water supplied from the water supply source does not previously pass through the first filter before the flow path shifting valve supplies the water from the water supply source to the first filter, and
    in response to the value measured by the water quality sensor being greater than the predetermined water quality value, the processor is configured to control the flow path shifting valve to supply the water supplied from the water supply source to the second filter through the second water line.

2. The water purifier of claim 1, wherein the first method is a direct-type water purification method, and the second method is a reverse osmosis water purification method.

3. The water purifier of claim 1,
    wherein the second water line is longer than the first water line.

4. The water purifier of claim 3, wherein the second water line is wound a plurality of times.

5. The water purifier of claim 1, wherein the water quality sensor is configured to measure electrical conductivity of the water supplied from the water supply source, to thereby measure the value indicating the quality of the water supplied from the water supply source.

6. The water purifier of claim 1, further comprising:
    a pre-treatment filter configured to receive, and then filter, the water supplied from the water supply source before being selectively supplied by the flow path shifting valve to the first filter or the second filter; and
    a post-treatment filter configured to receive, and then filter, the water filtered by the first filter and the water filter by the second filter.

7. The water purifier of claim 6, wherein the flow path shifting valve is configured to selectively supply the water filtered by the pre-treatment filter to the first filter or the second filter.

8. The water purifier of claim 6, wherein the water quality sensor is configured to measure the value indicating the quality of water supplied from the water supply source before the water supplied from the water supply source is received by the pre-treatment filter.

9. The water purifier of claim 2, further comprising:
    a first flow sensor configured to measure an amount of water supplied to the first filter; and
    a second flow sensor configured to measure an amount of water supplied to the second filter.

10. The water purifier of claim 9, wherein the processor is further configured to determine whether to replace the first filter based on the amount of water measured by the first flow sensor, and determine whether to replace the second filter based on the amount of water measured by the second flow sensor.

11. The water purifier of claim 10, wherein in response to the processor determining to replace the first filter based on the amount of water measured by the first flow sensor, the processor is configured to:
    generate a filter replacement notification signal indicating the first filter needs to be replaced, and
    control the flow path shifting valve to supply the water supplied from the water supply source to the second filter and not the first filter.

12. The water purifier of claim 10, wherein
    in response to the processor determining to replace the second filter based on the amount of water measured by the second flow sensor, the processor is further configured to:
    generate a filter replacement notification signal indicating the second filter needs to be replaced, and
    in response to the value measured by the water quality sensor being greater than the predetermined water quality value, not perform a water discharge command to thereby stop a discharge of purified water to a user when the user provides an input requesting purified water.

13. A method for controlling a water purifier, the method comprising:
    measuring, by a water quality sensor, a value indicating a quality of water supplied to the water purifier from a water supply source; and
    controlling, by a processor, a flow path shifting valve based on the value measured by the water quality sensor, to selectively supply the water supplied from the water supply source to a first filter or a second filter, the first filter being configured to filter, by a first method, water supplied to the first filter, and the second filter being configured to filter, by a second method, water supplied to the second filter,
    wherein controlling, by the processor, the flow path shifting valve based on the value measured by the water quality sensor comprises:
    in response to the value measured by the water quality sensor being less than a predetermined water quality value, controlling, by the processor, the flow path shifting valve to supply the water supplied from the water supply source to the first filter through a first water line such that the water supplied from the water supply source does not previously pass through the first filter before the flow path shifting valve supplies the water from the water supply source to the first filter, and in response to the value measured by the water quality sensor being greater than the predetermined water quality value, controlling, by the processor, the flow path shifting valve to supply the water supplied from the water supply source to the second filter through a second water line, wherein the first water line includes a front end between the flow path shifting valve and a front end of the first filter and a rear end formed at a rear end of the first filter, wherein water supplied along the first water line does not pass through the second filter, and the second water line includes a front end between the flow path shifting valve and a front end of the second filter and a rear end formed at a rear end of the second filter, wherein the rear end of the first water line extends from the rear end of the first filter to a point at which the rear end of the first water line and the rear end of the second water line are connected to one another, without passing through the flow path shifting valve.

14. The method of claim 13, wherein the first method is a direct-type water purification method, and the second method is a reverse osmosis water purification method.

15. The method of claim 14, further comprising:
measuring an amount of the water supplied to the first filter and an amount of water supplied to the second filter.

16. The method of claim 15, further comprising:
determining whether to replace the first filter based on the measured amount of water supplied to the first filter; and
determining whether to replace the second filter based on the measured amount of water supplied to the second filter.

17. The method of claim 16, further comprising:
in response to determining that the first filter is to be replaced:
   generating a filter replacement notification signal indicating the first filter needs to be replaced, and
   controlling the flow path shifting valve to supply the water supplied from the water supply source to the second filter and not the first filter.

18. The method of claim 16, further comprising:
in response to determining that the second filter is to be replaced:
   generating a filter replacement notification signal indicating the second filter needs to be replaced, and
   in response to the value measured by the water quality sensor being greater than the predetermined water quality value, controlling so as to not perform a water discharge command to thereby stop a discharge of purified water to a user when the user provides an input requesting purified water.

* * * * *